United States Patent [19]
Hodges

[11] Patent Number: 4,973,128
[45] Date of Patent: Nov. 27, 1990

[54] HIGH GAIN OPTICAL FIBER VIEWING DEVICE

[76] Inventor: Marvin P. Hodges, 1565 Shadowglen Ct., West Lake Village, Calif. 91361

[21] Appl. No.: 345,438

[22] Filed: May 1, 1989

[51] Int. Cl.⁵ .............................................. G02B 6/06
[52] U.S. Cl. ............................... 350/96.25; 350/96.27
[58] Field of Search ........................... 350/96.25, 96.27

[56] References Cited

U.S. PATENT DOCUMENTS

| | | | |
|---|---|---|---|
| 3,712,724 | 1/1973 | Pratt | 350/96.27 X |
| 3,753,607 | 8/1973 | Kitano et al. | 350/96.25 |
| 3,864,034 | 2/1975 | Yevick | 350/96.25 X |
| 4,299,447 | 10/1981 | Soltan et al. | 350/96.25 X |
| 4,650,280 | 3/1987 | Sedlmayr | 350/96.27 |

Primary Examiner—John D. Lee
Assistant Examiner—Phan T. Heartney
Attorney, Agent, or Firm—Mason, Kolehmainen, Rathburn & Wyss

[57] ABSTRACT

A high grain optical fiber viewing device utilizes image and object planes that are orthogonal to the fiber axis. Optics are provided at the object plane that ultimately defines the audience window, which can be varied and changed at will. Anti-reflectant immersed optics can be added to the input plane to improve efficiency.

13 Claims, 1 Drawing Sheet

U.S. Patent
Nov. 27, 1990
4,973,128
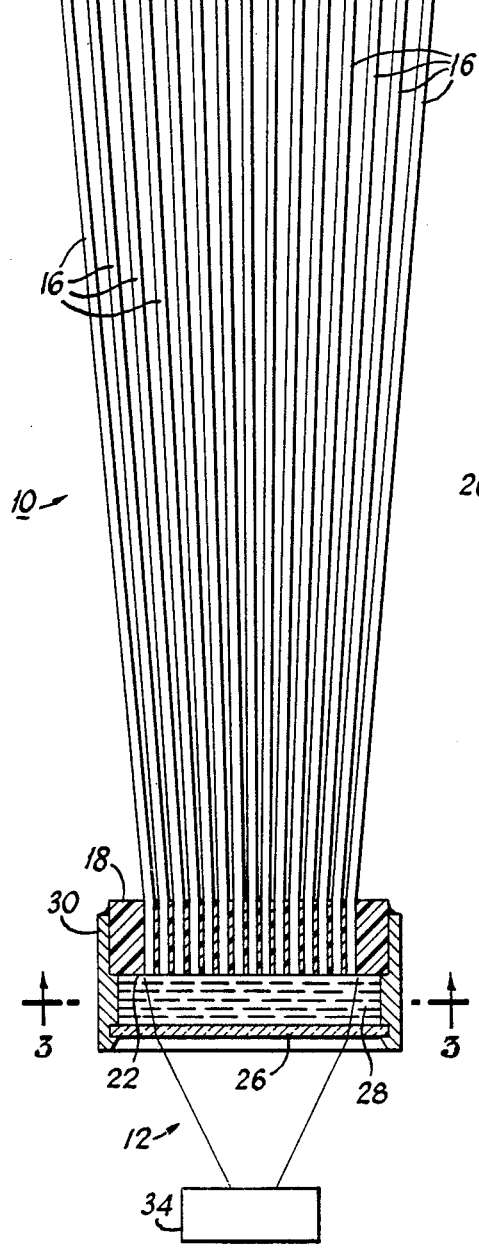
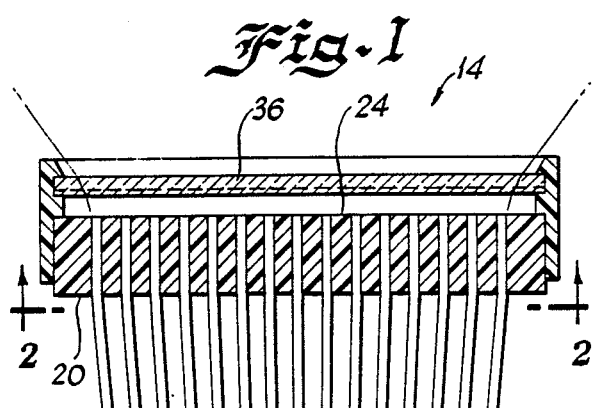
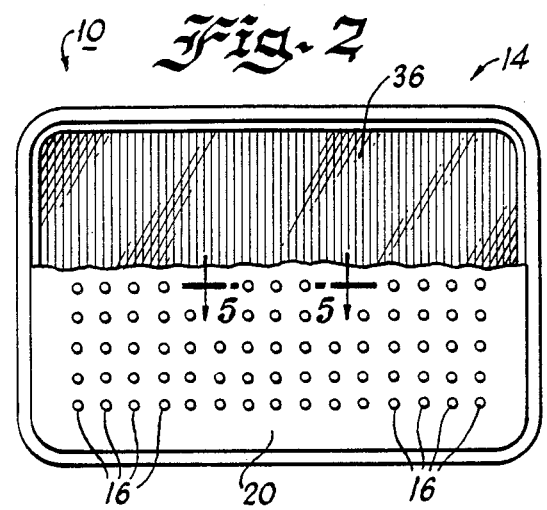
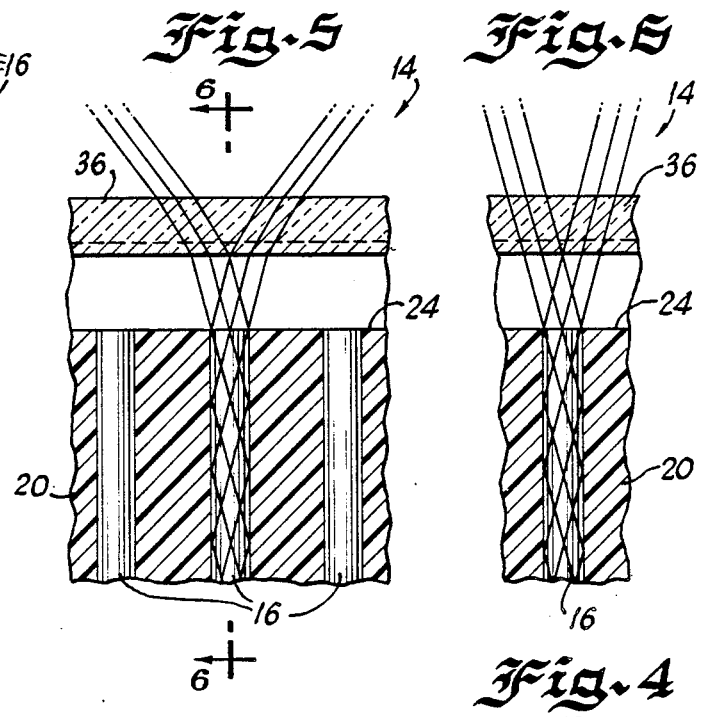
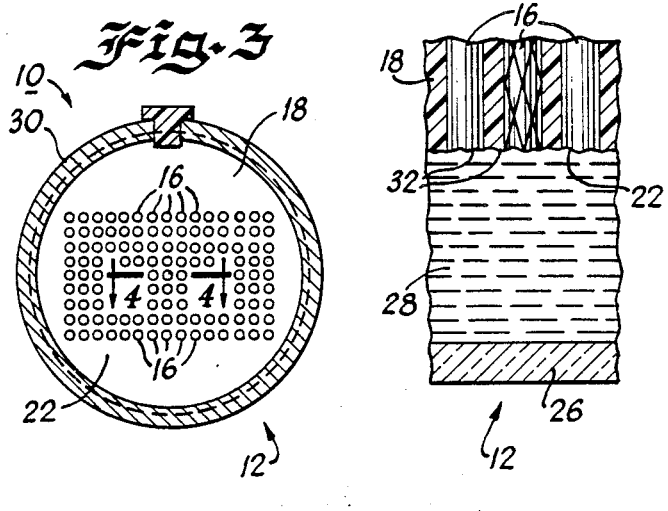

HIGH GAIN OPTICAL FIBER VIEWING DEVICE

BACKGROUND OF THE INVENTION

1. Field of the Invention

This invention relates generally to optical devices, and more particularly to optical fiber direct view display devices.

2. Prior Art

Fiber optic display devices are known and are employed in a variety of ways including display screens in public places such as airports, shopping malls, and the like. In such systems a fiber optics conduit is used to enlarge an image obtained from a transparency, video display or other source and display it on a viewing surface that is substantially larger than the surface of the source image.

While the prior art systems do provide a way to enlarge and display an image on a viewing surface, such systems tend to be inefficient in that they transfer only a small proportion of the light from the image to the viewing screen. This occurs because, although the fiber optic medium is itself an efficient light transfer mechanism, inefficient coupling between the input and output faces of the fiber optics and the external environment substantially reduces the efficiency of the system. Examples of such prior art systems are illustrated in U.S. Pat. Nos. 4,116,739; 4,208,096 and 4,650,280. These prior art systems transmit approximately 12% to 34% of the energy imposed on their input faces to their output faces. All of these prior art systems also generate Lambertion fans at their output faces with spread angles of up to 180 degrees, thereby wasting a substantial portion of the energy that is transmitted from the input face.

Among the reasons for the lack of efficiency is the lack of perpendicularity of the viewing face to the axis of the optical fibers. This causes a portion of the light exiting the fiber to be reflected back toward the source, a phenomena known as critical trapping. Trapping occurs when the internal bounce angle of a fiber plus the angle of tilt from the perpendicular of the viewing face exceeds the critical trapping angle. The internal bounce angle is approximately half of the inherent cone angle, or field of view, of the fiber. The critical trapping angle depends on the optical medium but is approximately 42° for plastic fibers.

Additionally, any tilt of the object plane without an equal tilt of the image plane will introduce increasing anamorphic distortion into the regenerated image. Anamorphic distortion increases with the offset from perpendicularity between the image and object planes and the optical fibers, and results in an elongation of the regenerated image away from the fiber axis, the amount and direction of elongation corresponding to the tilt of the object plane.

Irregularities on the interfaces between air and the object planes can also reduce transmission efficiency. A minute scratch or coarse polish can trap rays as they leave the object plane. The input and output cone angles of the fibers also cause inefficiencies when they are not optimized for the imaging source and the audience window. These various factors combine in the prior art systems to reduce transmission efficiency to less than fifty percent of the energy impinging on the input face.

SUMMARY

Accordingly, it is an object of the present invention to provide an optical fiber viewing device that overcomes many of the disadvantages of the prior art systems.

It is another object of the present invention to provide an optical fiber viewing device that has greater transmission efficiency than prior art fiber optic viewing devices.

It is another object of the present invention to redistribute wasted energy not available for audience viewing to an accessible audience zone.

It is another object of the present invention to provide an optical fiber viewing device wherein the image and object planes of the device are orthogonal to the fiber axis.

It is another object of the present invention to optimize the input cone angle to the imaging source.

It is another object of the present invention to optimize the output cone angle to the audience window.

It is another object of the present invention to provide an optical fiber viewing device wherein the input image plane can be immersed to reduce reflections and the effects of irregularities.

Briefly, in accordance with the present invention, there is provided an optical fiber viewing device whose image and object planes and input and output faces are orthogonal to the fiber axis. The cone angle of the fibers is selected to be optimum for the particular image source utilized, and optics are provided at the object plane to alter the cone angle so that energy exiting the fiber optics is concentrated on the audience, i.e., within the audience window. The image plane is immersed to reduce reflections at the input air interface.

DESCRIPTION OF THE DRAWING

These and other objects and advantages of the present invention will become readily apparent upon consideration of the following detailed description and attached drawing wherein:

FIG. 1 is a top plan view of the fiber optic device according to the invention;

FIG. 2 is a cross sectional view of the device taken along line 2—2 of FIG. 1 and illustrating the optical fibers and the lenticulated lens utilized to increase the horizontal viewing angle;

FIG. 3 is a cross sectional view of the device taken along line 3—3 of FIG. 1 illustrating the image plane and the immersed optics;

FIG. 4 is an enlarged cross sectional view taken along line 4—4 of FIG. 3 showing the details of the image plane and the immersed optics;

FIG. 5 is a cross sectional view taken along line 5—5 of FIG. 2 illustrating the horizontal viewing angle of the viewing end optics; and FIG. 6 is a cross sectional view of one of the optical fibers taken along line 6—6 of FIG. 5 illustrating the vertical viewing angle of the viewing end optics.

DETAILED DESCRIPTION OF THE PREFERRED EMBODIMENT

Referring now to the drawing, with particular attention to FIG. 1, there is shown a high gain fiber optic viewing device according to the invention generally designated by the reference numeral 10. The device 10 has an image receiving end 12 and a viewing end 14, and interposed between the image receiving end 12 and viewing end 14 are a plurality of light carrying optical fibers 16 that carry the image from the image receiving end to the viewing end. The optical fibers 16 are generally round (although they may be other shapes) and may range in size from 0.00025 inch to 0.125 inch in diameter although 0.001 inch in diameter is preferred in the specific embodiment described herein. Various numbers of fibers per square inch may be utilized depending on the resolution desired and the diameter of the fiber selected. If a 0.001 inch diameter fiber is selected and arranged in coherent order, the number of fibers will average approximately 2500 per square inch.

The optical fibers are arranged in an ordered two-dimensional array and supported at opposite ends in a pair of supporting blocks 18 and 20. The spacing of the fibers in the two supporting blocks may be the same if no image enlargement or reduction is desired, or the spacing may be different in the event that it is desired to change the size of the image. In the embodiment illustrated in FIG. 1, the spacing of the fibers 16 within the support block 20 is slightly greater than the spacing in the block 18 (FIGS. 2 and 3) to provide some image enlargement, and in a practical embodiment, six orders of magnitude of image enlargement have been obtained by an appropriate spacing of the fibers 16 within the blocks 18 and 20. More enlargement, or less enlargement, can be achieved depending on viewing requirements. In the example shown where an image is enlarged, FIG. 3 shows the spacing of the fibers 16 at the receiving end 18 as closer than the spacing of the fibers 16 shown on the viewing end 14 in FIG. 2. The desired spacing can be achieved in any conventional manner. For example, the fiber 16 can be spirally wound in layers around a pair of blocks 18 and 20, each block formed from a series of presized spacers placed over and separating each layer. The spacing of the fibers 16 at the viewing end 14 increases with respect to the spacing of the fibers 16 of the receiving end 12 in direct proportion to the amount of enlargement desired.

In accordance with an important aspect of the invention, the supporting blocks 18 and 20 and the fibers 16 contained therein are cut at an angle perpendicular to the axes of the fibers 16 and polished to form an image plane 22 and an object plane 24. The image plane 22 is the focus of an image projected from any conventional source 34 for projecting light, while the object plane 24 regenerates the transmitted image. To optimize the transfer of light from the image plane 22 to the object plane 24, the image and object planes 22 and 24 are made orthogonal to the axes of the fibers 16 and reflections at the image and output planes are minimized by utilizing an optical anti-reflectant at the input and output planes and by utilizing immersed optics to reduce the effects of irregularities at the image plane 20. Forming the image and object planes 22, 24 perpendicular to the fiber axes eliminates the trapping of light which progressively increases as the object plane is tilted from the perpendicular with respect to the fiber axes, while forming the individual fibers 16 perpendicular to the fiber axes eliminates anamorphic distortion. To reduce reflections at the image plane 22 and the object plane 24, the object plane 24 is coated with an anti-reflectant and the image plane 22 is coupled to immersed optics. Although the image plane 22 could also be coated to reduce reflections, it has been found beneficial to utilize immersed optics to provide anti-reflection since any irregularities 32 which remain after polishing the fiber ends 16 at the image plane 22 will disappear in the immersed optics.

In order to achieve the immersed optics, a planar substrate 26 having an index of refraction similar to the index of refraction of the fibers 16 is first polished and is coated with an anti-reflectant. The image plane 22 is then immersed in a liquid 28 having substantially the same index of refraction as the fibers 16 and the substrate 26. As is illustrated in FIGS. 1 and 3, the liquid 28 may be contained in a suitable housing 30. The advantage of immersing the image plane 22 is that the irregularities 32 appearing on the image plane 22 optically disappear because the index of refraction of the fibers 16 and the liquid 28 are the same. This permits the image to be projected onto an imaginary plane near the image plane 22 without substantial reflection. Further, the planar surface may itself contain lenticulations to alter the image rays to conform to the acceptance angle of a predetermined fiber.

In addition to optimizing the transfer of light by reducing reflections at the image and object planes, it is desirable to optimize the field of view of the fiber optics device to conform the field of view to the projection angle of the image source and to the audience viewing window.

For example, it is desirable to select the inherent cone angle of the fibers 16 so that the viewing window of the image plane 22 is approximately equal to either the angle occupied by the source 34, which may be any conventional device for projecting images, or by the vertical angle of the audience window. Assuming an imaging source with a cone angle of 26 degrees and a preferred audience window of 30 degrees in the vertical plane, a fiber with an inherent cone angle of 30 degrees is preferred. The inherent cone angle of the fibers 16 can also be selected to conform to the horizontal angle of the audience window. However, since the vertical angle of the audience window is generally smaller than the horizontal angle, conforming the inherent cone angle of the fibers 16 to the vertical angle is preferred. In general, the vertical angle of the viewing window will not exceed 40°.

It is also desired to obtain as wide a horizontal viewing window as possible to accommodate the most people and to permit the image to be viewed over a wide area of the room. An output lens comprising a lenticulated planar structure is used to adjust the viewing angle of the device to the preferred audience window. A vertically lenticulated lens or a fresnel lens 36 is utilized to increase the horizontal angle and consequently the horizontal viewing window. The lens 36 includes a diffraction grating having 140 lines per inch in the vertical direction, with a grating depth of 0.002 inch. An air interface no greater than the depth of the grating can be maintained between the lens and the object plane. Preferably, the grating is in contact with the object plane. The lens 36 is illustrated in FIG. 5 which shows how the cone angle of the optical fibers 16 is increased a predetermined amount by the vertically lenticulated lens 36 in the horizontal direction. Because a vertical lenticulated pattern was used, there is no change in the vertical angle as illustrated in FIG. 6. Optimally, an inherent cone angle of 30° is expanded horizontally to provide an approximate horizontal viewing window of 70° while the vertical viewing window remains approximately 30°.

The invention provides for interchangeable lenticulated substrates so that the viewing parameters of the device can be changed at will. Gains of 50 times are possible for daylight viewing with a vertical audience window of 7 degrees and a horizontal audience window of 25 degrees. Or an audience window with a 30 degree vertical angle can have its horizontal angle altered to 180 degrees.

Use of a lenticulated lens also totally eliminates the localized hot spotting which can occur when a viewer is not viewing the display on-axis to all of the fibers.

Additional improvements include the arrangement of the image plane fibers and the binder (adhesive) selected to bundle the image plane area. In imaging systems, the image plane is constructed into a rectangular window, to accept film and video aspect ratios. The positioning, and fiber shapes, dictate the relative aperture (speed) of the image plane window. Round fibers cannot totally occupy a rectangular space: if positioned in columnar form, they can achieve a 78% aperture; if interleaved, an effective aperture of 82% can be obtained, while square fibers could occupy up to 96% of a rectangular space. In bonding the plurality of fiber ends to form the image plane, differential clamping pressure on plastic fibers during cure can distort round fibers into squarer patterns, producing relative apertures of up to 88%.

Of greater importance is the proper selection of an optical adhesive that cements these arrayed fibers into the image plane window. Most manufacturers of prior art fiber screens have ignored an ancient optical law "anything in an optical path, not in optical use, should be blackened" and have employed cements that wet-out the fiber's cladding thus mutating the fiber's characteristics along the bonded region, and most specifically at the image plane. Such practices seriously restrict the collection angles and efficiency of the fiber used (up to a 60% reduction), generate ray scattering at the image plane and deteriorate resolution. A darkened adhesive solves these problems.

What is claimed and desired to be secured by Letters Patent of the United States is:

1. A fiber optic image transmission system, comprising:
    a bundle of arrayed fibers having an image plane at an input end thereof to focus an image and an object plane at the opposite end thereof providing a transmitted image, said bundle of fibers being operative to transfer an image from said image plane to said object plane, each of said fibers having a predetermined cone angle that defines the viewing window for said object plane; and
    a lenticulated lens covering said object plane that simultaeously alters the viewing window for said image emanating from said input end.

2. A fiber optic image transmission system as recited in claim 1 wherein said object plane is orthogonal to the arrayed fibers.

3. A fiber optic image transmission system as recited in claim 1 wherein said image plane is orthogonol to the arrayed fibers.

4. A fiber optic image transmission system as recited in claim 1 wherein said lenticulated lens comprises a planar substrate having a lenticulated diffraction grating formed thereon.

5. A fiber optic image transmission system as recited in claim 4 wherein said lenticulated diffraction grating is formed on a single surface of the planar substrate, said surface facing the object plane.

6. A fiber optic image transmission system as recited in claim 5 wherein said lenticulated diffraction grating is in contact with said object plane.

7. A fiber optic image transmission system as recited in claim 1 wherein said object plane is polished and has an anti-reflectant coating disposed thereon.

8. A fiber optic image transmission system as recited in claim 1 wherein said system transmits an image from an impinging imaging source having a predetermined cone angle, and wherein the cone angle of said fibers is selected to substantially match the cone angle of the imaging source.

9. A fiber optic image transmission system as recited in claim 1 wherein said viewing window has horizontal and a vertical field angle, and wherein the cone angle of said fibers is selected to restrict the vertical angle of the viewing window to less than 40°.

10. A fiber optic image transmission system as recited in claim 9 wherein said lenticulated lens alters the horizontal field angle of said viewing window.

11. A fiber optic image transmission system as recited in claim 1 wherein said lenticulated lens is provided on a removable substrate.

12. A fiber optic image transmission system as recited in claim 1 further including a transparent substrate adjacent said image plane, said transparent substrate having a refractive index similar to the refractive index of said fibers.

13. A fiber optic image transmission system as recited in claim 12 including a fluid located between said image plane and said transparent substrate, said fluid having a refractive index similar to the refractive index of said fibers.

* * * * *